Figure 1:
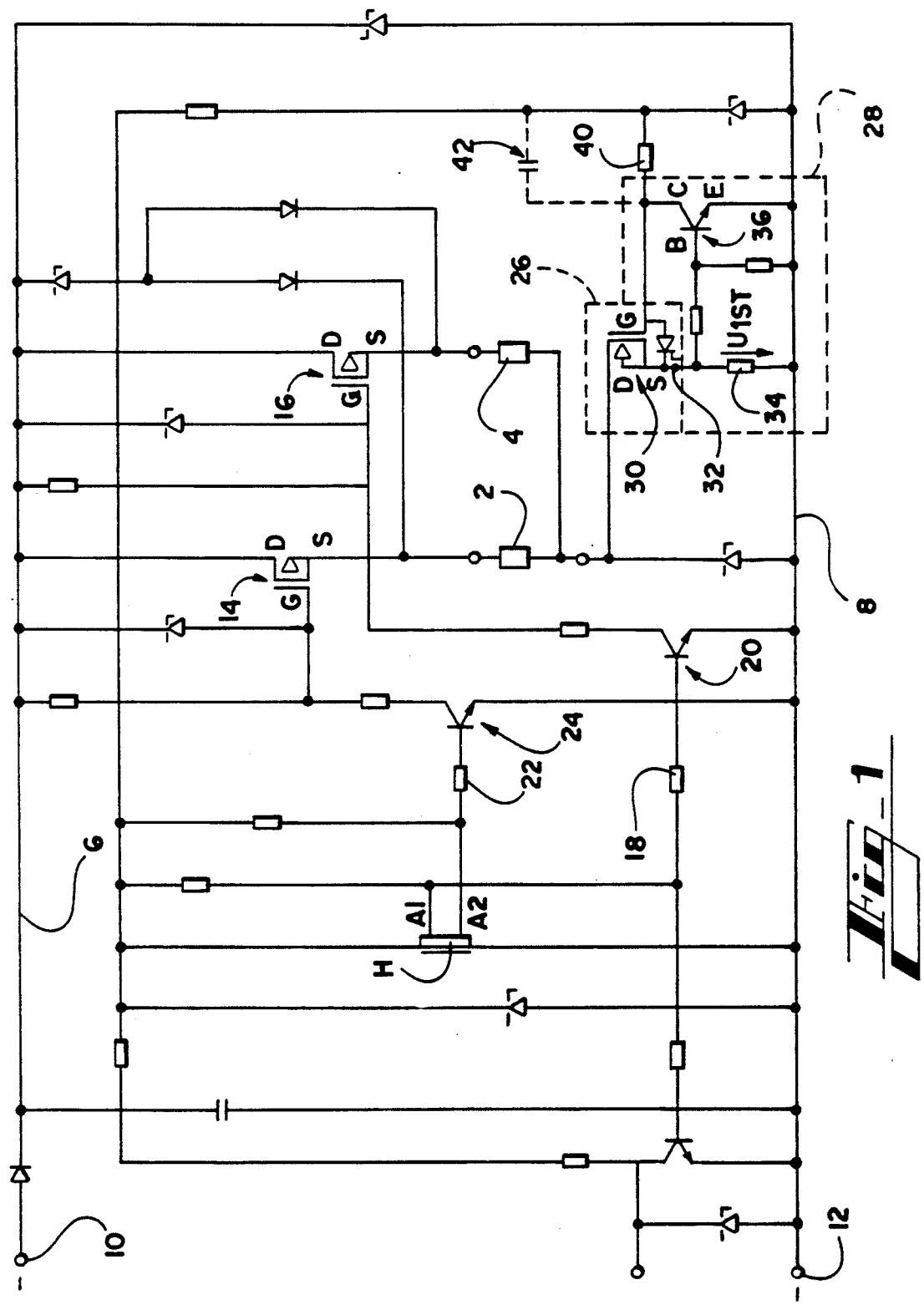

United States Patent [19]

Reinhart et al.

[11] Patent Number: 5,162,710
[45] Date of Patent: Nov. 10, 1992

[54] TRIGGER CIRCUIT WITH BLOCKING PROTECTION DEVICE FOR A COLLECTORLESS DC MOTOR

[75] Inventors: Wilhelm Reinhart, Schrozberg-Gütbach; Helmut Lipp, Hohebach; Karl-Heinz Schultz, Öhringen-Cappel, all of Fed. Rep. of Germany

[73] Assignee: ebm Elektrobau Mulfingen GmbH & Co., Fed. Rep. of Germany

[21] Appl. No.: 726,292

[22] Filed: Jul. 5, 1991

[30] Foreign Application Priority Data

Jul. 7, 1990 [DE] Fed. Rep. of Germany ....... 4021663

[51] Int. Cl.$^5$ ............................................ H02H 7/085
[52] U.S. Cl. .................................... 318/254; 318/471; 388/934
[58] Field of Search .............. 318/138, 254, 434, 439, 318/471, 293; 388/917, 934; 361/24, 25, 27

[56] References Cited

U.S. PATENT DOCUMENTS

| | | | |
|---|---|---|---|
| 3,909,690 | 9/1975 | Sugiura | 318/138 |
| 4,472,666 | 9/1984 | Akeda et al. | 318/254 |
| 4,473,781 | 9/1984 | Nielsen | 318/254 |
| 4,473,782 | 9/1984 | Reinhardt et al. | 318/254 |
| 4,588,933 | 5/1986 | Sun | 318/254 |
| 4,716,486 | 12/1987 | Sobiepanek et al. | 361/24 |
| 4,740,734 | 4/1988 | Takeuchi et al. | 318/254 |
| 4,985,666 | 1/1991 | Nakabayashi | 318/434 |

Primary Examiner—Bentsu Ro
Attorney, Agent, or Firm—Jones, Askew & Lunsford

[57] ABSTRACT

The invention pertains to a control circuit for a collectorless DC motor where at least one power transistor (14, 16) is input-connected to each stator coil (2, 4) of the motor; said transistor is driven by at least one rotor position sensor, especially a Hall generator having commutation circuits to commute the motor current, and where a blocking protection device is provided to interrupt the motor current in an overload or blockage. The blocking protection device (26) has at least one semiconductor circuit (30) carrying the motor current which is switched through or blocked depending on its temperature.

10 Claims, 2 Drawing Sheets

TRIGGER CIRCUIT WITH BLOCKING PROTECTION DEVICE FOR A COLLECTORLESS DC MOTOR

The present invention pertains to a control circuit for a collectorless DC motor, where each stator coil of the motor has at least one input-connected power transistor that is triggered by a commutator circuit having at least one rotor position sensor, especially a Hall generator, to commutate the motor current, and where a blocking protection device is provided to interrupt the motor current in overloads or jamming.

This type of control circuit is described, e.g., in DE-OS 34 18 276, DE-OS 34 05 942, DE-OS 32 03 691 and in DE-OS 32 03 829. All of these circuits monitor the counter-EMF induced in the stator coils while the motor is running, and in the case that the counter-EMF goes to zero or falls below a set minimum value—which is an indication of jamming or partial jamming (deceleration) of the motor—the motor current is shut off. This protects the coils and in particular, the power transistors against destruction. But the disadvantage is the need for a separate circuit for start-up, i.e., a start-up bridge, which bridges the start-up phase while the induced counter-EMF is still too small. Moreover, the known circuits are suitable only for motors of low to medium power.

The invention is based on the problem of creating a control circuit with reduced circuitry and component requirements that is suitable for higher power motors.

According to the invention, this is achieved by a blocking protection device having at least one semiconductor circuit element carrying the motor current, said semiconductor element is switched-through or blocked depending on its temperature. This semiconductor element can be connected in series with the stator coils, in addition to the commutator power transistors. This means that only one single semiconductor element is required. But alternatively, every stator coil can have its own semiconductor element connected in series, and then preferably every semiconductor element is formed by one of the commutator power transistors, i.e., commutator power transistors form the invented semiconductor circuit elements that are switched according to their normal commutation and also as a function of their temperature.

Now, the invention is based on the consideration that a certain motor current causes a certain power loss and thus also a certain temperature of the semiconductor element, so that the maximum permissible power loss can be assigned to a particular temperature. Once this temperature is reached, the semiconductor will be shut off. The motor can be turned on again either by brief turn-off of the feed voltage, or automatically after cooling, which is achieved by a separate circuit which will be described below.

The present invention thus represents a turn away from the state of the art, where a blocking protection feature was always provided based on the induced counter-EMF. Fortunately, the special circuitry for the start-up phase is eliminated here. According to the invention, a start-up is possible even without additional measures, given a suitable design of the semiconductor element.

In a favorable modification of the invention, a so-called power limiter circuit is also integrated into the invented trigger circuit. This power limiter circuit monitors the particular motor current and shuts it off once the maximum permissible current value is reached. This power limiter circuit takes effect especially in the motor start-up phase when an increased motor current occurs, so that this current is not limited by the induced counter-EMF. But on the other hand, the power limiter circuit is naturally also active during motor jamming, since the counter-EMF is then missing, and thus the motor current rises. Since the motor current is shut off once the maximum permissible value is exceeded and is turned on again when below this maximum value, a steady clock cycling (timing) of motor current is achieved.

During the motor's start-up phase, the motor current decreases with increasing motor speed due to the build-up of counter-EMF below the maximum value, so that the fraction of timing occurring in the start-up phase due to the increased start-up current is ended. In a motor jam however, the motor current would always remain above the maximum value, so that the described timing will continue until the timed, increased motor current causes power loss in the invented semiconductor element and thus a rise in its temperature, until it blocks the motor current.

According to the invention the semiconductor element is joined in a good, thermal-conducting contact to a temperature sensor that, in the case of a temperature rise, causes the semiconductor element to switch off once the maximum permissible chip temperature is reached. Preferably the semiconductor element is of MOSFET design and the temperature sensor is connected as a semiconductor circuit, especially as a thyristor, between gate and source of the MOSFET. Once the maximum permissible chip temperature of the MOSFET is reached, the temperature sensor switches through and thus short-circuits the gate-source route. This causes the input capacitance of the FET to discharge suddenly and it shuts off independently. It is particularly favorable to design the semiconductor element and the temperature sensor as an integrated unit, especially as a TEMPFET. In this known component, a transistor chip and a temperature sensor chip are separated only by a thin adhesive layer so that an exceptionally good thermal contact is ensured between the two components. Thus fast temperature increases are reliably detected.

The invention will be explained below based on two sample designs shown in the figures.

FIG. 1: The first sample design of an invented control circuit for a two-path, two-pulse collectorless DC motor, and FIG. 2: A second sample design of the control circuit for a three-path, six-pole collectorless DC motor.

In both figures, the same or equivalent parts and components always bear the same reference numbers.

FIG. 1 shows the invented control circuit for a collectorless DC motor with two stator coils (2 and 4), i.e., for a two-path, two-pulse motor. The two stator coils (2, 4) are connected in parallel between a plus line (6) and a minus line (8). Thee two lines (6 and 8) are connectable via terminals (10 and 12) to a power source. In series with each stator coil (2, 4) there is one power transistor (14, 16), and these power transistors (14 and 16) in the present example are designed as FET (MOSFET) whose drain-source path (D-S) is in series to the stator coils (2 or 4, respectively), and its gate (G) is driven by a commutation circuit. This commutation circuit in the present sample design consists essentially of a Hall generator (H) with two outputs (A1 and A2). The first output (A1) is linked via a base resistor (18) to the base of an amplifier transistor (20) whose collector-emitter path drives gate (G) of power transistor (16). Analogous to this, the second output (A2) of the Hall generator (H) is linked via a base resistor (22) to the base of a second amplifier transistor (24) whose collector-emitter path drives gate (G) of the power transistor (14).

The invented control circuit also contains a blocking protection device (26) and preferably also a power limiter circuit (28). These components are indicated by dashed lines in FIG. 1 and will be explained in detail below.

The blocking protection device (26) in the design of FIG. 1 of the invention has a semiconductor circuit element (30) carrying the motor current and is connected in series to stator coils (2, 4); in this example, between stator coils (2, 4) and the minus line (8). Preferably the semiconductor element consists of a field-effect transistor (FET) and in particular, a MOSFET whose drain-source path (D-S) is in series with stator coils (2, 4) and thereby conducts the motor current. Semiconductor element (30) according to the invention is in a good thermal contact with a temperature sensor (32) designed as semiconductor switch, especially as a thyristor, and is connected between gate (G) and source (S) of the FET forming the semiconductor element (30). Semiconductor element (30) and the temperature sensor (32) can be designed as integrated components, i.e., as TEMPFET.

The power limiter circuit (28) has an ammeter resistor (34) that likewise carries the motor current and for this purpose is connected in series to stator coils (2, 4) and thus also in series to semiconductor element (30). Parallel to the ammeter resistor (34) there is a base-emitter path (B-E) of a control transistor (36) that drives semiconductor element (30), i.e., gate (G) of the FET, via its collector-emitter path (C-E).

The first sample design of the invented trigger circuit shown in FIG. 1 operates as follows.

1. Normal operation

The Hall generator (H) outputs two complementary output signals during the rotor rotation; these signals last for an electrical pulse duration of about 180°. This means that two current pulses are fed to the stator coils (2, 4) according to each 360° rotor rotation. The output signals of the Hall generator (H) are each fed via the base resistors (18, 22) to the preamplifier transistors (20 and 24). Depending on the setting of the rotor, a positive output voltage is now applied either to output (A1) or output (A2) of Hall generator (H), while at the other output, the negative potential of the minus line (8) is applied. The output signals of the Hall generator (H) have relatively steeply rising and falling flanks, so that nearly rectangular output signals are present. Now, if a positive output signal is applied to output (A1), then first the amplifier transistor (20) is switched through, so that power transistor (16) is switched through via its collector-emitter path. Thus a motor current can flow from the plus line (6) via the emitter-collector path or via the drain-source path of power transistor (16), via the stator coil (4), via the semiconductor element (30) initially viewed as switched-through, and also via the ammeter resistor (34) to the minus line (8). The other output (A2) of the Hall generator (H) at this time conducts the negative potential of the minus line (8). The consequence is that the second amplifier transistor (24) is blocked, so that the power transistor (14) is also blocked. After a rotor rotation of 180° (electrical), in the two-pulse, two-path motor, the output signals of the Hall generator (H) alternate, so that now output (A1) bears negative, and output (A2) bears positive potential. Thus the transistors (20) and (16) are blocked and the amplifier transistor (24) and power transistor (14) are switched through, so that then a corresponding current flows via the stator coil (2). This commutation from one coil to the other occurs after a rotor rotation of 180° (electrical). This is the "normal," i.e., undisturbed, operation of the motor.

2. Start-up phase

In the motor's start-up phase the (preferably) provided current limiter circuit (28) is active. This is an advantage, since as a rule the start-up phase requires that a specified start-up current may not be exceeded in order not to overload the available voltage source, for example. Due to the flowing motor current, a certain voltage drop occurs at the ammeter resistor (34); however, said voltage drop does not suffice in the above-described normal operation to switch through the control transistor (36). Now if the motor current exceeds a certain, preset maximum value, then with increasing voltage drop at the ammeter resistor (34), i.e., for a certain reference voltage $U_{ref}$, the transistor (36) can switch through, whereupon the negative potential of the minus line (8) is applied to gate (G) of semiconductor element (30). Thus a rapid discharge of gate (G) occurs, which leads to a blocking of semiconductor element (30) and thus to an interruption of the motor current. Due to this interruption of the motor current, the voltage drop at the ammeter resistor (34) decreases, so that the turn-on threshold of the control transistor (36) is not reached and it then goes back into the barrier mode. Thus the negative potential to gate (G) of semiconductor element (30) disappears, whereupon it can be triggered again. Thus the motor current can flow again. Due to the greater start-up current arising from the still small counter-EMF in the start-up phase, the motor current to the ammeter resistor (34) will again cause such a voltage drop that a further blockage of semiconductor element (30) is effected in the described manner. Consequently, in the start-up phase there results a steady timing of the motor current via semiconductor element (30). With increasing motor speed of rotation, the counter-EMF rises with the result that the motor current decreases, since the counter-EMF counteracts the motor current, whereupon the voltage drop at the ammeter resistor (34) no longer exceeds the turn-on threshold of control transistor (36) and it then remains blocked. After this moment, the semiconductor element (30) is no longer blocked and the start-up phase is thus completed.

3. Blocking

A critical case that could lead to destruction of the motor or of individual components of the motor due to overheating, will occur when the rotor of the motor is blocked. Due to the absence of counter-EMF due to the stoppage, the motor current is only limited by the ohmic portion of the motor coil (2 or 4) and thus assumes such large values that failure of the motor could occur. In this case, in the preferred design of the invention, i.e., with integrated current limitation circuit (28), first a timing of semiconductor element (30) takes place in the manner described above. But since this timing is not terminated due to the absence of counter-EMF during blocking, after a certain time an increased power loss occurs within semiconductor element (30), which leads to elevated temperature within this circuit element (30). If the maximum permissible chip temperature, e.g., about 150° C., is exceeded, then the temperature sensor (32) short-circuits the gate-source path (G-S). Thus a sudden discharge of the input capacitance occurs, which leads to shutdown of this semiconductor element (30) (TEMPFET). In this manner the motor current is shut off.

Then if the blocking is subsequently removed and the chip temperature reduced, either an automatic re-turn-on of semiconductor element (30) will occur, for which a parallel circuit of resistor (40) and a capacitor (42) is input-connected to gate (G). Alternatively, only resistor (40) can be input-connected to gate (G) (which is why capacitor (42) is shown by dashed connector lines), so that then the motor current will be turned on again only after a brief turn-off of the feed voltage. This means that then the temperature sensor (32) possesses a genuine thyristor function. Start-up then occurs in the manner described above.

Figure 2:
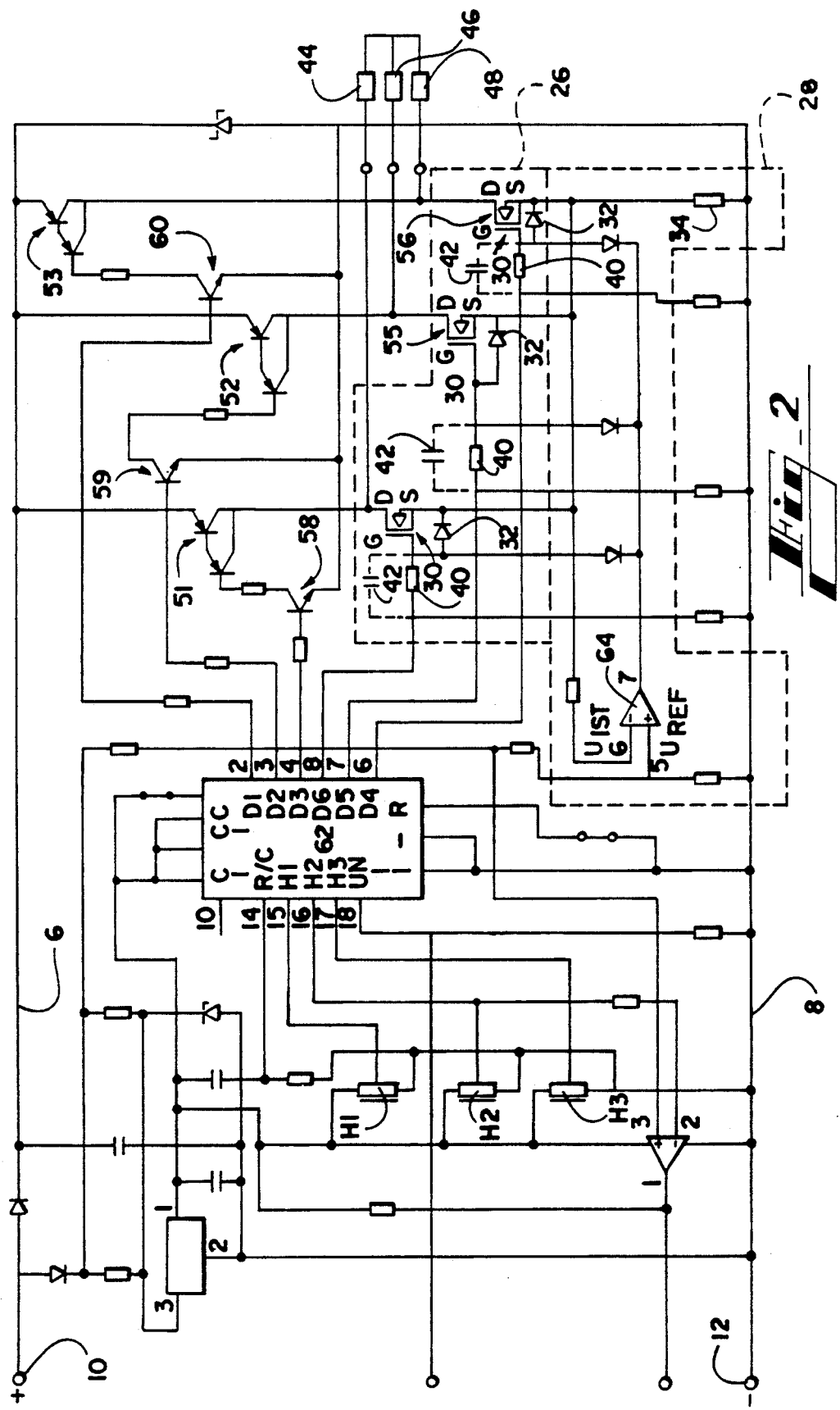

FIG. 2 shows a second sample design of the invented control circuit, and here this control circuit is suitable for a three-path, six-pulse collectorless DC motor. This three-path motor has three stator coils (44, 46 and 48) set in a star circuit in a three-phase bridge circuit of six commutation power transistors (51, 52, 53, 54, 55 and 56). Power transistors (51, 52 and 53) of the "upper" branch of the bridge are designed as Darlington transistors in the present example. Furthermore, an amplifier transistor (58, 59, 60) is input-connected to these transistors. The sequence of triggering the power transistors is specified by the output signals of, e.g., three digital switching Hall generators (H1, H2, H3) offset to each other by 60° electrical (30° mech). The output signals of the Hall generators are fed to an evaluator circuit (62) that drives the power transistors in pairs. Power transistors (51, 52, 53) of the upper branch of the bridge are triggered via the amplifier transistors (58, 59 and 60), while the power transistors (54, 55 and 56) of the lower branch of the bridge are triggered directly. The evaluator circuit (62) sets the trigger timepoints of the power transistors as a function of the rotor position. Now the power feed to stator coils (44, 46, 48) occurs in a known manner such that at a specified commutation timepoint, every two series-connected stator coils are turned on simultaneously. Since this is not an essential constituent of the present invention, a more precise description is unnecessary.

Power transistors (54, 55 and 56) of the lower branch of the bridge now form according to the invention a semiconductor switching element (30) as already described according to FIG. 1. Consequently, every semiconductor element (30) also has the described temperature sensor (32). Otherwise, refer to the discussions of FIG. 1.

Furthermore, the design of FIG. 2 also shows the power limiter circuit (28) which here too, has the ammeter resistor (34) connected in series with the stator coils and carrying the motor current. However, in contrast to the design in FIG. 1, the voltage drop of ammeter resistor (34) is fed to a first input of a comparator (64) as actual voltage $U_{ist}$. A reference voltage $U_{ref}$ is fed to a second input of comparator (64) preferably via a voltage divider consisting of resistors. One output of comparator (64) is linked to gate (G) of all three semiconductor elements (30), i.e., the power transistors of the lower branches of the bridge, and in this case each via one input diode.

The operation of the trigger circuit shown in FIG. 2 will be explained briefly below.

1. Start-up

If an excessive start-up current occurs during the start-up phase, then the voltage drop $U_{ist}$ of the ammeter resistor (34) exceeds the reference voltage $U_{ref}$, so that comparator (64) is switched through, i.e., negative potential is applied to gate (G) of semiconductor element (30). The result is that the input capacitance of the now conducting power transistor or semiconductor element (30)—depending on the rotor position—is suddenly discharged and this transistor blocks immediately. Due to the interruption in motor current, the voltage drop of ammeter resistor (34) decreases and falls below the reference voltage, so that the comparator can again switch its output. This causes the gates (G) of semiconductor element (30) to be "released" again by the evaluator circuit (62) for triggering. Now, in connection with the conducting power transistor (51, 52 or 53) of the upper branches of the bridge, power is applied to the corresponding stator coils selected by the evaluator circuit. Then the motor current is timed analogous to the discussion of FIG. 1 until the counter-EMF limits the motor current so that the maximum value is no longer exceeded.

2. Blocking

The described timing of motor current occurs during blocking, but in this case only by timing of one semiconductor element (30) selected in the particular timepoint corresponding to the stopped position of the rotor. The continued timing in the manner described above causes a switch-through of the gate-source path at elevated chip temperature, which is connected with a discharge of the input capacitance and causes an immediate blocking of the affected semiconductor element (30). The corresponding coil current is now interrupted and circuit element (30) can cool down again. After dropping below the shut-down temperature, an automatic turn-on occurs, or turn-on only after turn-off of the feed current. Automatic turn-on occurs if a suitably sized parallel circuit of resistor (40) and capacitor (42) is placed in the trigger circuit of semiconductor element (30). If automatic turn-on is not desired, then capacitor (42) can be omitted, which is why it is shown by dashed lines in FIG. 2.

Also notice that the actual circuit examples of FIGS. 1 and 2 can be combined with each other in any way. For example, in the design of FIG. 1 it is also possible to design the two power transistors (14 and 16) as invented semiconductor elements (30) with temperature sensor (32) instead of the single semiconductor element (30). Furthermore, it is possible here to use a comparator analogous to FIG. 2 instead of the control transistor (36) for the power limiter circuit (28). Similarly, in the design of FIG. 2 it is possible to set a single semiconductor element (30) with temperature sensor (32) in series with the stator coils (44 to 48), analogous to FIG. 1. In addition, the invention is in no way limited to the illustrated and described sample designs, but also applies to all designs having the same effect as the invention.

We claim:

1. Control circuit for a collectorless DC motor where each stator coil of the motor has at least one of several input-connected commutation power transistors (14, 16; 51 to 56) which are triggered by a commutator circuit having at least one rotor position sensor to commutate the motor current, comprising:

a blocking protection device (25) operative to interrupt the motor current in overloads or jamming, said blocking protection device having at least one semiconductor element (30) carrying the motor current and being either switched-through or blocked depending on the temperature of the semiconductor element;

each semiconductor element (30) being linked via a good thermal-conducting contact to a temperature sensor (32) operative in response to a temperature rise to cause the semiconductor element (30) to block current flow once a certain maximum permissible temperature of the semiconductor element (30) is reached; and each semiconductor element (30) comprising a MOSFET and said temperature sensor (32) being a semiconductor switch connected between gate (G) and source (S) of said MOSFET.

2. Control circuit according to claim 1, wherein the semiconductor element (30) of the blocking protection device (26) is connected in series with stator coils (2, 4; 44 to 48) in addition to the commutation power transistors (14, 16; 51 to 56).

3. Control circuit according to claim 1, wherein each stator coil (2, 4; 44 to 46) has a semiconductor element (30) of the blocking protection device (26) input-connected in series, whereby each semiconductor element (30) is formed by one of the commutation power transistors (14, 16; 51 to 56).

4. Control circuit according to claim 1, wherein each semiconductor element (30) and the temperature sensor (32) are integrated into one component as a TEMP-FET.

5. Control circuit according to claim 1, wherein each semiconductor element (30) blocked due to temperature is operative to be turned on again only after a brief turn-off and turn-on of a supply voltage.

6. Control circuit according to claim 1, wherein each semiconductor element (30) blocked due to temperature is operative to turn on again automatically after cooling; and further comprising a parallel circuit including resistor (40) and capacitor (42) input-connected to the gate (G) of the MOSFET.

7. Control circuit according to claim 1, further comprising a power limiting circuit (28) operative in the start-up phase of the motor to turn off the motor current when a certain maximum permissible current value is reached, and operative to turn on when the motor current is below the maximum value.

8. Control circuit according to claim 7, wherein the power limiting circuit (28) has an ammeter resistor (34) carrying the motor current and connected in series with the stator coils (2, 4; 44 to 48); and the voltage drop ($U_{ist}$) of the ammeter resistor is fed to a trigger stage operative to turn off the motor current when the voltage drop ($U_{ist}$) is greater than or equal to a certain reference voltage ($U_{ref}$) representing the maximum current value.

9. Control circuit according to claim 8, wherein the trigger stage has a controlling transistor (36) whose base-emitter path is driven by the voltage drop ($U_{ist}$) of the ammeter resistor (34) and whose collector-emitter path drives each semiconductor element (30) of the blocking protection device (26).

10. Control circuit according to claim 8, wherein the trigger stage has a comparator (64) where the voltage drop ($U_{ist}$) of the ammeter resistor (34) is applied to a first input of the comparator (64) and the reference voltage ($U_{ref}$) is applied to a second input of the comparator, and where one output of the comparator (64) drives each semiconductor element (30) of the blocking protection device (26).

* * * * *